United States Patent [19]
Brun et al.

[11] 3,810,500
[45] May 14, 1974

[54] APPARATUS FOR CONNECTING A MOBILE TANK WITH LOADING PLATFORM

[75] Inventors: Marcel Brun; Alfred Riegert, both of Aix en Provence, France

[73] Assignee: Pechiney Ugine Kuhlmann, Paris, France

[22] Filed: Oct. 18, 1971

[21] Appl. No.: 190,243

[30] Foreign Application Priority Data
Oct. 16, 1970 France .................. 70.37362

[52] U.S. Cl. .............. 141/231, 141/284, 141/375, 141/376, 214/43
[51] Int. Cl. ...... B65b 3/06, B67c 5/06, B65g 69/22
[58] Field of Search .......... 141/284, 375, 376, 231, 141/232, 233; 214/43

[56] References Cited
UNITED STATES PATENTS

| | | | |
|---|---|---|---|
| 3,489,101 | 1/1970 | Kennedy | 214/43 X |
| 811,653 | 2/1906 | Moseley | 141/376 X |
| 1,684,319 | 9/1928 | Heiden | 214/43 |
| 1,722,349 | 7/1929 | Woodward | 141/284 X |
| 2,634,871 | 4/1953 | Cline | 214/43 |
| 3,241,581 | 3/1966 | Richardson | 141/284 X |
| 646,508 | 4/1900 | Taylor | 141/284 X |
| 3,168,124 | 2/1965 | Lenkey | 141/284 |
| 3,545,501 | 12/1970 | Hohlbaum | 141/284 X |
| 3,599,683 | 8/1971 | Linsowe | 141/232 |
| 3,605,830 | 9/1971 | Haskins | 141/284 |
| 3,664,386 | 5/1972 | Wenzel | 141/231 X |
| 3,483,829 | 12/1969 | Barry | 214/43 X |

Primary Examiner—Wayne A. Morse, Jr.

[57] ABSTRACT

The invention relates to an apparatus for connecting a mobile tank to a loading and unloading station including a platform for the guidance of the pipes of the loading station for alignment with the pipes of the tank in which the platform which is suspended at the station has two transverse guide ramps and one longitudinal guide stop, while the other member has a pivotable finger which can act upon the ramps and the stops.

6 Claims, 4 Drawing Figures

APPARATUS FOR CONNECTING A MOBILE TANK WITH LOADING PLATFORM

This invention relates to an apparatus for connecting a mobile tank to a loading or unloading station.

The loading and unloading operations of a mobile tank, transportable over roads, land or water, require the precise location of the tank below a loading or unloading station, the connection of flexible pipes from the station to the corresponding pipes of the tank and finally the operation of motor pump means or gas under pressure, in order to bring about the transfer of a gaseous, liquid or pulverulent material.

In case of a tank for transportation of a liquid or pulverulent material, it is sufficient to connect a flexible pipe from the station with a pipe of the tank. If the tank is partitioned to provide compartments for the same or different substances, at least one pipe and one pipe system per compartment are provided.

In case of a tank for unloading a liquid, there may exist in addition, a pipe and a pipe system for a motor means, an electrical cable and connection or a gasoline motor.

In case of a tank for unloading a pulverulent substance, the latter is usually fluidized and additional pipes and pipe system assemblies are provided for the fluidization gas and possibly for the gas to be transported, when the latter is different from the former.

These operations are carried out manually or, in case of particularly heavy flexible pipes, with the aid of lifting devices. They are cumbersome and require time which in certain cases may be equal to or even longer than the time for the loading or unloading operations.

It is an object of this invention to provide equipment for connecting a mobile tank to a station.

This and other objects and advantages of this invention will hereinafter appear, and for purposes of illustration, but not of limitation, an embodiment of the invention is shown in the accompanying drawings, in which -

The equipment, according to the invention, comprises at least one pipe solidly connected to the station and at least one pipe system solidly connected to the tank, each pipe of the station being able to coact with a pipe system of the tank. At least one of the components, the pipe or pipe system, is provided with a motor means in vertical translation. A positioning means for the pipes comprises a guiding platform suspended at the mobile station for movement in the longitudinal and transverse direction, and it also comprises a platform centering means. The latter includes, on the one hand, two transverse guide ramps and a longitudinal guide stop, and, on the other hand, a finger pivotable about a horizontal shaft and capable of acting on the ramps and the stop, with one of these members being solidly connected to the platform and the other one to the stop.

According to a preferred embodiment of the invention, the centering device of the platform is constituted by at least one trapezoidal finger, each finger being able to coact with a corresponding opening provided on the platform.

The connection is preferably carried out by penetration of the pipes into the tubings, or of the tubings into the pipes, which can be provided with tight tips.

Figure 1:
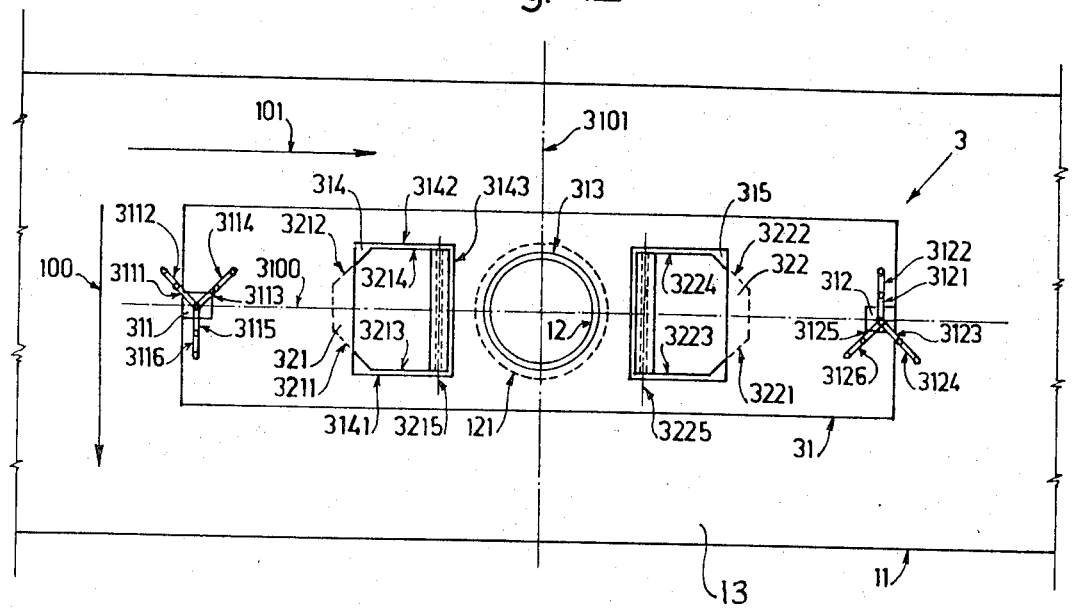
FIG. 1 is a top plan view of a portion of the tank and equipment for connection to the loading station in accordance with the practice of this invention.
Figure 2:
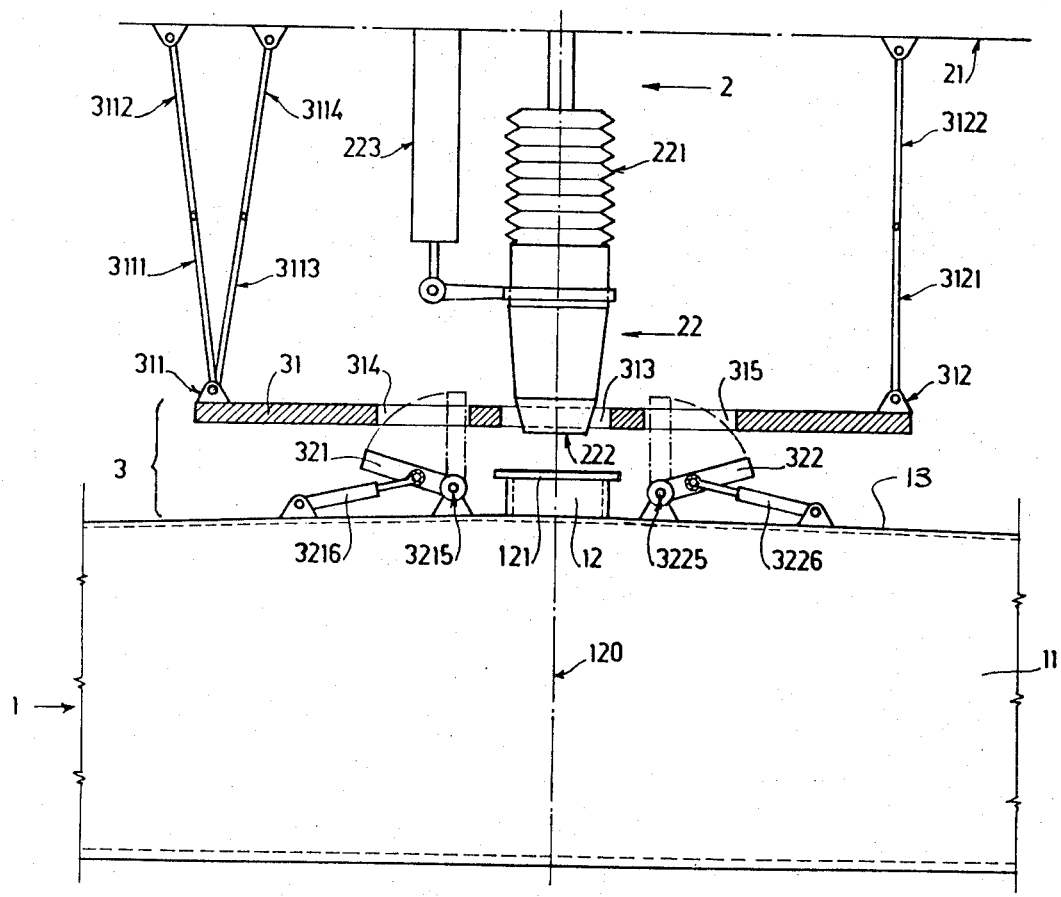
FIG. 2 is an elevational view in section of the elements shown in FIG. 1.

The embodiment of the station and tank shown in FIGS. 1 and 2 corresponds to the simple case of loading or unloading of a fluid, such as hydrocarbons.

The tank to be loaded has a reservoir 11 and a tubing 12 on the top side 13 communicating with the interior of the reservoir and terminating in a flange 121.

The loading station 2 includes the frame shown schematically by a line 21 and a pipe 22 formed with a flexible fitting 221. The pipe 22 is mobile in vertical translation as by means of a jack 223 which may be in the form of an electrical solenoid or fluid operated cylinder and piston arrangement connected by the horizontally disposed bracket to the pipe 22.

The equipment for connecting the tank to the station includes a device 3 for positioning the pipes, such as 22. It includes a mobile horizontally disposed platform 31 mounted for movement longitudinally and transversely, while it remains substantially in the same horizontal plane. This platform is suspended from the frame 21 of the station 2 by articulated shafts. In the embodiment shown this suspension is accomplished along two points of the platform: point 311 bears three elongate flexible members, each formed of two shafts articulated between or pivotally connected to each other 3111, 3112; 3113; 3114; and 3115, 3116. The upper ends of these three pairs of shafts are arranged to form the tops of an equilateral triangle. A similar suspension arrangement is provided on the other side at 312 except that the equilateral triangle formed by the ends of the three pairs of suspension rods 3121, 3122; 3125, 3126 and 3123, 3124 are rotated 60° in relation to those of the triangle relating to point 311. In the absence of a tank, this arrangement assures the automatic return of the platform into its balanced position. The platform 31 is provided with an intermediate opening 313 dimensioned to have a cross section at least as great as that of the pipe 22, to enable passage of the pipe 22 therethrough, said opening assuring the guidance of the pipe and allowing the platform to move it in horizontal direction for alignment with the tubing 12. The platform is also provided with two openings 314 and 315 of rectangular shape. The tank is provided with its top side with two trapezoidal fingers 321 and 322, positioned to enter into these openings 314 and 315, respectively. The fingers are pivoted for rocking movement about horizontal shafts 3215 and 3225, respectively, journaled to brackets fixed to the top side of the tank and which are parallel with the small side of the platform 31. Rocking movement of the fingers is controlled by jacks 3216 and 3226, respectively. The lateral edges of the openings, such as 3141 and 3142, operate as ramps for displacement of the platform in the direction of the arrow 100 while the edge 3143 operates as an abutment for displacement in the direction of the arrow 101 to effect proper positioning of the platform relative to the tank.

The apparatus operates as follows: the tank is placed at the loading or unloading station in an approximate position. The fingers 321 and 322 are actuated by the jacks 3216 and 3226 to their raised position. If the tank is not in the exact position, the fingers move the platform 31 so as to center the pipe 22 in relation to the piping 12. In fact, if the tank is put in place laterally so that platform movement is necessary in the direction of the arrow 100, in order to bring the longitudinal axis 3100 of the platform in a position where it meets the axis 120 of the tubing 12, when the finger 321 is lifted, its inclined edge 3211 comes in contact with the ramp-forming edge 3141 of the opening 314. As the finger continues its rise, it pushes the edge 3141 of the opening 314 until its right edge 3213 comes in contact with the edge 3141. The same operation takes place at the side of the finger 322 so that, when both fingers are lifted, the shaft 3100 of the platform is in alignment with the shaft or axis 120 of the tubing 12. If the placement of the tank requires a shifting movement of the platform in the reverse direction, the side 3212 of the finger 321 operatively engages the ramp 3142 of the opening 314, the finger 322 acting accordingly. Likewise, if the tank is put in place longitudinally, so that a movement of the platform in the direction of the arrow 101 is necessary, to bring the transverse shaft 3101 of the platform into a position where it is aligned with the shaft 120 of the tubing 12, the rise of the finger 321 causes the latter to repel the abutment-forming edge 3143 of opening 314 until, with the finger in vertical position, the shaft 3101 of the platform encounters the shaft 120. In case of an error in the longitudinal placement which requires a correction in the reversed direction, finger 322 acts likewise. Thereafter only the shaft of the jack 223 has to be extended for downward displacement of the pipe 22 so as to cause the frusto-conical end 222 of the pipe to penetrate the tubing 12 for proper connection to load the tank.

It is possible to improve the suspension of the platform 31 by providing three suspension points (not shown). Point 312 is kept unchanged, while point 311 is replaced by two suspension points located at the adjacent corner portions of the rectangular platform. The shafts of these two points are oriented parallel with those of point 311.

Thus it is possible to provide for each of the suspension points four pairs of articulated shafts, whose upper ends are located on the corners of a square (not shown). This arrangement can be employed whether the suspension is constructed with two or three suspension points.

The pairs of articulated shafts may be replaced by any other sufficiently flexible member, such as a cable, chain, or even a combination of a shaft and a cable, a shaft and a chain, or a cable and a chain. A shaft suspended on a ball and socket joint, completed, for the lower third by a chain, is perfectly suitable.

FIGS. 1 and 2 show an arrangement in which the fingers 321 and 322 are in raised position in the side of their respective openings 314 and 316, adjacent the opening 313. Thus they are in the immediate vicinity of the tubing 12. This may sometimes be inconvenient. To remedy this, it suffices to reverse the arrangement, so that the fingers extend toward the tubing 12 in horizontal position. While in raised position, they are adjacent the points of attachment 311 and 312.

Naturally, it is possible to provide more than three suspension points.

Figure 3:
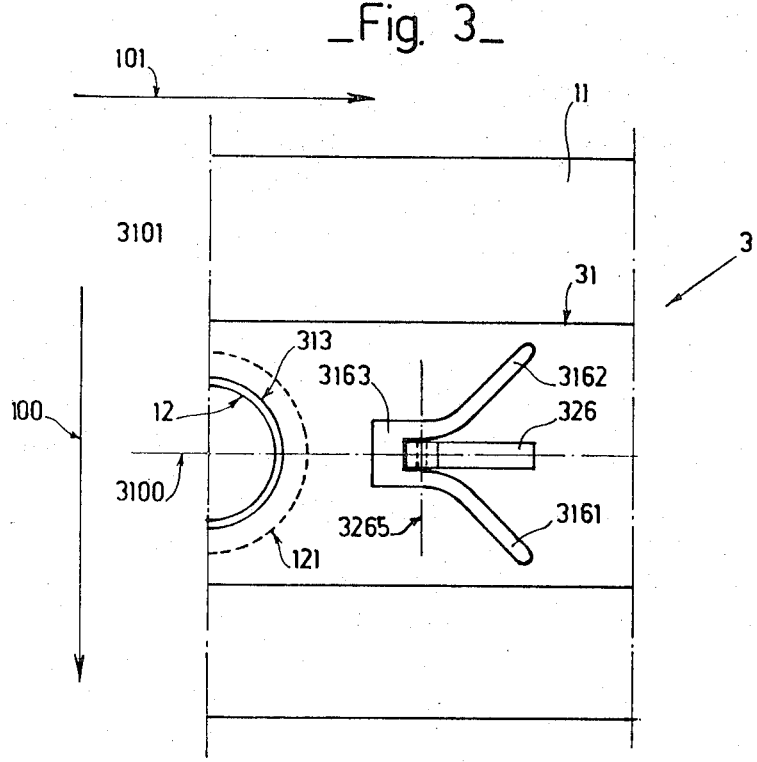
FIG. 3 is a top plan view of a modification in the apparatus shown in FIG. 1.
Figure 4:
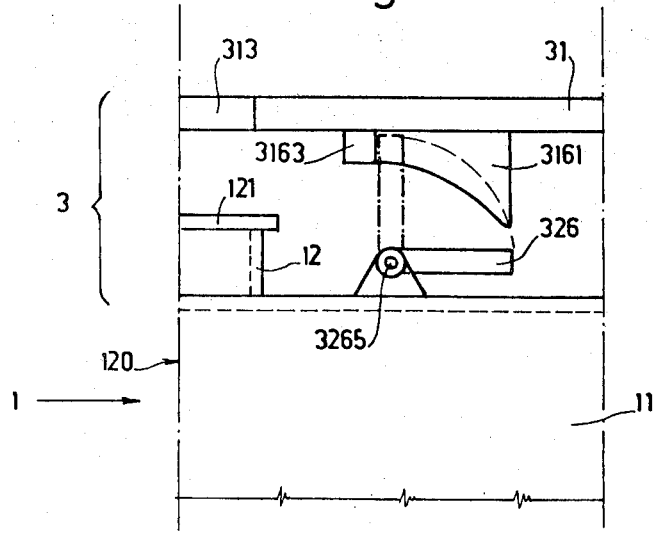
FIG. 4 is a side elevational view of the elements shown in FIG. 3.

A variant of a positioning device is shown in FIGS. 3 and 4. The platform 31 is provided, on its lower wall, with two ramps 3161 and 3162 joined by an abutment 3163. The tank is provided with a finger 326 of constant width, for example of rectangular or cylindrical cross section, mounted for pivotal movement about a shaft 3265 between raised and lowered position, as by means of a jack shown in FIG. 1. Assuming the tank to be perfectly centered, that is in such a position that the axes of symmetry 3100 and 3101 of the platform 31 intersect on the axis of the tubing 12 of the tank, the abutment 3163 is so placed that it is in contact with the finger 326 when the latter is in substantially raised position, shown in broken lines in FIG. 4. The ramps 3161 and 3162 are arranged symmetrically in relation to the shaft 3100, by progressively spreading from said shaft as one moves away from the abutment 3163. They are located with regard to the latter on the same side as the finger 326, in lowered horizontal position with regard to its shaft 3265. The width of the finger 316 is slightly less then the cross distance between ramps 3161 and 3162 at their junction with the abutment 3163 where this distance is very small. This device exists, of course, in two locations, preferably on opposite sides of the tubing 12, as in the modification shown in FIGS. 1 and 2.

The operation is analogous with that of the device according to FIGS. 1 and 2. The centering in transverse direction (direction of the arrow 100) is effected by action of the finger 326 on the ramp 3161 if the displacement is to be effected in the reversed direction. Likewise, the centering in the longitudinal direction is accomplished by the action of the finger 326 on the abutment 3163 for a displacement in the opposite direction of the arrow 101, and by action of the symmetrical finger (not shown) on the corresponding abutment or lug for a movement in the direction of the arrow 101.

It can be seen that, in the case of FIGS. 1 and 2, the lateral sides 3141 and 3142 of the openings can be cut along the profiles of the ramps 3161 and 3162 of FIGS. 3 and 4; then the finger 321 takes on a constant length equal to the minimum transverse distance of sides 3141 and 3142.

It goes without saying that the arrangement of the ramps and of the finger may be reversed, with the ramps on the tank and the fingers on the platform 31. The arrangement shown, however, is preferred because it is the easiest one to be realized.

The apparatus shown may be completed at will, for example, by using several loading pipes 22, corresponding to an equal number of tubings 12 of the tank and of openings 313 in the mobile platform 31. For hauling pulverulent materials loaded and unloaded in a fluidized form, it is possible to provide pipes and tubings for loading and unloading with compressed air. Evidently several centering means can be provided, each of which is applied to one or several pipe-tubing assemblies.

It will be understood that changes may be made in the details of construction, arrangement and operation, without departing from the spirit of the invention, especially as defined in the following claims.

We claim:

1. In an apparatus for connecting a mobile tank having at least one compartment for receipt of a material to be transported and tubing on the top side of the tank communicating with the interior of the compartment, in combination with a station having a piping system or communicating with the tubing of the tank, with either the tubing or the piping system being mounted for vertical movement to bring the same into direct communication one with the other when properly aligned, the improvement in means for effecting alignment between said tubing and piping system comprising a horizontally disposed guiding platform, means defined by the platform for engaging said piping system and for thereby moving the piping system in response to platform movement, means suspending the platform for movement in a horizontal plane in longitudinal and transverse directions, a platform centering means comprising at least one opening of rectangular shape in the platform, the opposite parallel edges of which define guide ramps, with an edge in between operating as a guide stop, a guide finger mounted on the top side of the tank for rocking movement between raised and lowered positions, said guide finger having an end portion of trapezoidal shape dimensioned to extend into said opening when rocked to raised position whereby, when the platform is out of alignment, a ramp is engaged by the angular edge of the trapezoidal section of the guide finger to cause movement of the platform into proper alignment in the direction perpendicular to the ramps, while the guide stop is engaged by the finger in raised position to align the platform in the opposite direction, whereby the platform is automatically shifted into proper position for alignment between said tubing and piping system responsive to movement of the guide finger to raised position.

2. An apparatus as claimed in claim 1, in which the guiding platform is suspended in at least two points and by at least three flexible members per point.

3. An apparatus as claimed in claim 1, in which each flexible member is constituted by two inter-articulated shafts.

4. An apparatus as claimed in claim 1, in which the platform has at least two rectangular openings, the parallel side edges constituting said ramps, and one edge perpendicular to the parallel edges constituting said stop, and in which the guide fingers comprise two trapezoidal fingers mounted for rocking movement about a shaft parallel with the sides forming an abutment of the openings.

5. In an apparatus for connecting a mobile tank having at least cone compartment for receipt of a material to be transported and tubing on the top side of the tank communicating with the interior of the compartment, in combination with a station having a piping system for communicating with the tubing of the tank, with either the tubing or the piping system being mounted for vertical movement to bring the same into direct communication one with the other when properly aligned, the improvement in means for effecting alignment between said tubing and piping system comprising a horizontally disposed guiding platform, means defined by the platform for engaging said piping system and for thereby moving the piping system in response to platform movement, means suspending the platform for movement in a horizontal plane in longitudinal and transverse directions, a platform centering means comprising a pair of guide ramps and at least one guide stop carried by the platform, guide fingers mounted on the top side of the tank, said guide fingers having a constant width and being mounted for rocking movement between raised and lowered positions, on a pair of parallel shafts, said stops comprising abutment surfaces parallel with said shafts and having a width slightly greater than that of the fingers, and said ramps comprising finger engaging surfaces spreading outwardly from the respective abutment surfaces in a direction substantially perpendicular to said shafts and between which a guide finger extends when rocked to raised position, whereby when the platform is out of alignment, a ramp is engaged by the finger to effect displacement of the platform into properly aligned position in the direction perpendicular to the ramps, while the guide stop is engaged by the guide finger in raised position to effect displacement of the platform in the opposite direction, whereby the platform is automatically shifted into proper position for alignment between said tubing and piping system responsive to movement of the guide finger to raised position.

6. An apparatus as claimed in claim 5, in which the guiding platform is suspended in at least two points and by at least three flexible members per point.

* * * * *